United States Patent [19]

Ni

[11] Patent Number: 5,488,217
[45] Date of Patent: Jan. 30, 1996

[54] HIGH CURRENT CONTINUOUS WELDING DEVICE

[76] Inventor: Jian M. Ni, 75 Springbrook Drive, Richmond Hill, Ontario, Canada, L4H 3R3

[21] Appl. No.: 343,021

[22] Filed: Sep. 12, 1994

[51] Int. Cl.⁶ .................................................... B23K 9/133
[52] U.S. Cl. ................. 219/137.31; 219/137.61
[58] Field of Search ............... 219/137.2, 137.31, 219/137.7, 137.71, 145.23, 145.31, 136, 137.8, 137.61; 219/137.61

[56] References Cited

U.S. PATENT DOCUMENTS 2,133,970  10/1938  Christensen et al. ............. 219/145.31
3,049,609   8/1962  Purkhiser et al. ................. 219/137.71
4,954,690   9/1990  Kensrue ............................ 219/137.7

Primary Examiner—Clifford C. Shaw
Attorney, Agent, or Firm—David W. Wong

[57] ABSTRACT

This continuous welding apparatus has a high welding current efficiency. It includes a single drive belt mechanism having adjustable variable speeds for continuously advancing an elongated welding electrode to a welding location. The welding current is applied simultaneously through multiple contact points in the electrode by contact brushes to provide a high current for the welding operation. The brushes also serves as the carriers for advancing the welding electrode. A continuously formed weld can be made with such high efficiency welding device, and the resulting integrally formed weld is strong in strength and has a smooth surface appearance.

8 Claims, 1 Drawing Sheet

5,488,217

HIGH CURRENT CONTINUOUS WELDING DEVICE

BACKGROUND OF THE INVENTION

This invention relates to a welding apparatus and particularly to a continuous electrical welding apparatus having a high welding current efficiency.

Heretofore, welding rods have been commonly employed for welding purposes. In the welding operation, a welding rod consisting of a relatively short rod about 30 centimeters in length is used. The rod has a welding flux material coated on its surface. Such a welding rod provides a good quality weld in application and it only requires a rather simple welding equipment to carry out the welding operation. However, due to the relatively short length of such welding rod, in most welding operations, it is necessary to use a plurality of such rod to accomplish the task. Therefore, the weld formed in the welding operation by using a plurality of welding rods would have a plurality of weld sections therein formed by the use of the separate welding rods. The plurality of weld sections are thus not integrally formed and would inherently have many joints between adjacent sections. Such separately formed weld sections do not have a strong bond with each other, and they have a rough surface appearance whereas if the weld is continuously formed, there would be no joints in the weld and its would have a smooth surface.

Furthermore, in using a Welding rod, the welding current is necessarily supplied through the entire length of the welding rod to the work piece. Due to the inherent internal resistance in the metal core of the welding rod, a large amount of current is lost in flowing through the rod, so that the efficiency of the welding current is low.

Attempts have been made to provide an elongated welding electrode such that the welding operation can be accomplished with a single length of electrode continuously without having to disrupt the welding operation to provide new electrodes. In such continuous welding electrode, the welding metal is in the form of an elongated metal tube having welding flux material contained within the tube. However, such elongated tubular welding-electrode is extremely complex and expensive to produce mainly due to the difficulty in placing the welding flux material inside the metal tube. Moreover, since the welding current is still subject to loss when passing through such elongated welding electrode, the efficiency of the welding current is low and the weld formed with such electrode is low in quality.

In pending U.S. patent application Ser. No. 08/195,443 filed in Feb. 7, 1994 by the present Applicant, it is shown a high efficiency welding device which has a drive mechanism for feeding a continuous welding electrode to a weld area as well as simultaneously applying the high welding current in multiple contact points close to the front end of the electrode to eliminate the problem of current loss through welding electrode as in the use of welding rods. The drive mechanism shown therein consists mainly of a pair of drive chains driven directly by two pairs of driving gears. Although the device shown therein is satisfactory in providing a high current continuous welding operation, it is complex in structure and the welding electrode can only be fed to the work area in a constant single speed.

SUMMARY OF THE INVENTION

It is the principal object of the present invention to provide a welding apparatus which facilitates the use of elongated welding electrode having equal short length flux material coating disposed over its entire length for a welding operation.

It is an object of the present invention to provide a welding apparatus which is suitable for a continuous welding operation.

It is another object of the present invention to provide a welding apparatus which applies a high welding current to the welding electrode as well as automatically advancing the electrode towards the welding location for continuous welding operation.

It is yet another object of the present invention to provide a welding apparatus which has a relatively simple construction and has a variable speed control for varying the speed of the electrode drive selectively to suit various welding conditions.

BRIEF DESCRIPTION OF DRAWINGS

Other objects and advantages of the present invention will become apparent from the following detailed description of the preferred embodiments thereof in connection with the accompanying drawings, in which.

DETAILED DESCRIPTION OF THE PREFERRED EMBODIMENTS

Figure 1:
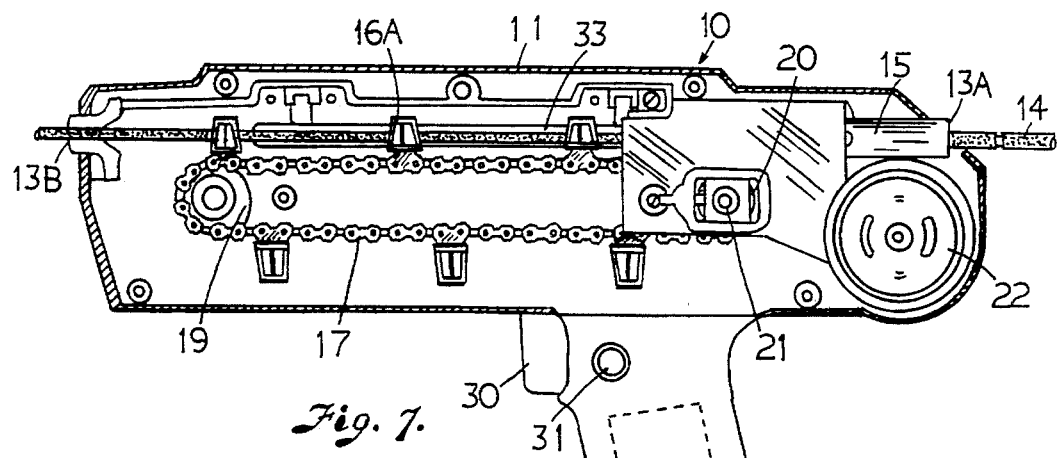
FIG. 1 is a partial schematic perspective side view of the welding apparatus with some portions of the enclosure removed to show the overall construction therein.

With reference to the drawings in which like reference numerals designate like parts in the several views, the welding apparatus 10 of the present invention may be in the form of a portable hand-held unit having an enclosure 11. The unit has a handle portion 12, an inlet 13A located at the rear end of the enclosure 11 for receiving the welding electrode 14, and an outlet 13B at the front end of the enclosure. The welding electrode 14 is an elongated flexible welding electrode having a welding flux compound coated in equal sections over its entire length as shown in Applicant's pending U.S. application Ser. No. 08/195,445 filed on Feb. 7, 1994. The metal core of the welding electrode is exposed in equal width gaps 14A provided between the flux compound coating sections 14B.

After the electrode 14 is inserted into the inlet 13A, it is directed by the guide tube 15 towards a drive mechanism which consists of a plurality of pairs of carriers 16A and 16B mounted at even intervals on a drive chain or belt 17. The spacing between the adjacent pairs of carriers is equal to the spacing between the gaps 14A in the flux coating of the welding electrode 14. Each carrier 16A and carrier 16B has a brush 18 mounted thereon. The brushes are made of a material such as brass having a high electrical conduction characteristic and hardness. The brushes are positioned perpendicular to the welding electrode 14, and they are normally spaced from each other at a distance equal to that of the diameter of the metal core of the welding electrode such that they will engage with the gap 14A in the welding electrode 14 when the latter is inserted into the apparatus.

The drive wheel 19 is coupled to a drive motor 22 through a linkage assembly 23 consisting of a transmission bar 24, a front worm gear arrangement 25 and a rear worm gear arrangement 26. The transmission bar 24 is coupled to the drive wheel 19 through the front worm gear arrangement 25, and it is also coupled to the drive shaft 27 of the drive motor 22 through the rear worm gear arrangement 26.

Figure 2:
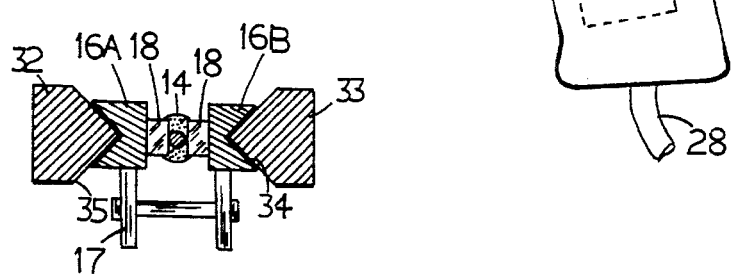
FIG. 2 is a partial cross sectional elevation view of the drive mechanism therein showing a pair of carriers mounted on the drive chain or belt of the present apparatus.
Figure 3:
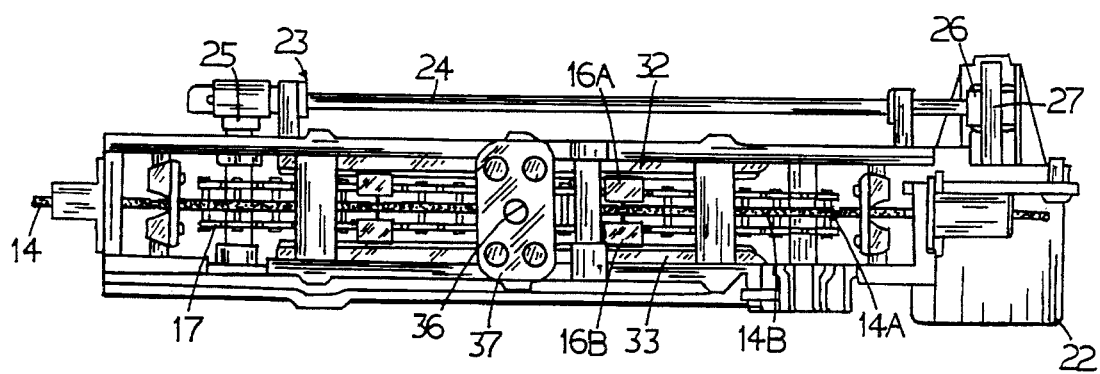
FIG. 3 is a top perspective view of the drive mechanism.

A power supply cord 28 connects the power supply to the device. The power is applied to the drive motor 22 through a speed control device 29 which may be actuated by operating a slide switch 30 slidably mounted in the handle 12 as best shown in FIG. 2. The slide switch 30 may be locked in the actuated position by a spring loaded latch button 31.

Two current bus bars 32 and 33 are mounted within the enclosure 11. The carriers 16A and 16B are in slidable contact with the bus bars 32 and 33 respectively. The welding current is connected to the bus bars 32 and 33 so that the current flows from the bus bars through the brushes to the metal core of the welding electrode 14. A V-shaped channel 34 may be formed in the rear end of the carriers 16A and 16B, and a complementary V-shaped profile 35 may be formed on the surface of the bus bars 32 and 33 to ensure the carriers would not accidentally slide out of engagement with the bus bars. The contact pressure between the carriers and the bus bars may be varied by adjusting the screw 36 mounted on a bracket 37.

In operation, the drive chain 17 is operated by actuating the slide switch 30. The speed of the rotation of the drive chain 17 may be controlled by squeezing the slide switch 30 in various amount. The speed control device 29 will respond with the selected degree of operation of the slide switch 30 to operate the drive chain 17 in the various speeds. The welding electrode 14 may be inserted into the inlet 13 until the first gap in the flux coating engages with a pair of brushes 18 which will then pull the welding electrode 14 forwards towards the outlet end 15. As the welding electrode 14 is pulled forwards more subsequent pairs of brushes mounted on the drive chain 17 will become engaged with a plurality of subsequent gaps in the welding electrode 14, so that the electrode 14 becomes being pulled forwards by a plurality of the brushes engaging with the associated gaps. In the meantime, the welding current flows from the bus bars 32 and 33 through the plurality of engaging brushes and gaps to the metal core of the welding electrode 14. Such multiple contacts along the welding electrode 14 results in that there is practically no current loss through the welding electrode to the work piece and it results in the formation of a high quality weld.

While preferred embodiments of this invention have been disclosed herein, those skilled in the art will appreciate that changes and modifications may be made therein without departing from the spirit and scope of this invention as defined in the appended claims.

What I claim as my invention is:

1. A portable continuous welding apparatus for use with an elongated welding electrode having a welding flux coating provided in equal length sections over a metal core wherein adjacent sections are spaced from each other by a gap exposing a portion of said metal core therein, comprising a portable housing having an inlet means for receiving said welding electrode to be inserted therein, and an outlet means for directing said welding electrode exiting from said housing towards a welding area, a drive wheel means rotatably mounted in said housing, a free wheel means rotatably mounted in said housing, a continuous drive chain means mounted over said drive wheel means and said free wheel means, a drive motor means coupled to said drive wheel means and being operative to rotate said drive wheel means for driving said drive chain means, a plurality of pairs of carrier means mounted at equal intervals on said drive chain means, each pair of carrier means comprising a first carrier means mounted on one side of said drive chain means and a second carrier means mounted on a second side of said drive chain means and located directly opposite to said one side, and said first carrier means and second carrier means having inner surfaces facing each other, a first brush means mounted on said first carrier means and a second brush means mounted on said second carrier means, said first brush means and second brush means extending outwards from said inner surfaces towards each other and being spaced from each other at a distance substantially equal to the diameter of said metal core of said welding electrode, said first carrier means having a rear surface therein and a first horizontal V-shaped channel formed in said rear surface of said first carrier means, said second carrier means having a rear surface therein and a second horizontal V-shaped channel formed in said rear surface of said second carrier means, a first elongated bus bar means disposed in a spaced manner along one side of said drive chain means, said first elongated bus bar means having a front surface therein disposed parallel to and facing said welding electrode, a first V-shaped ridge formed on said front surface, said first horizontal V-shaped channel of said first carrier means being slidably engageable with said first V-shaped ridge on said first elongated bus bar means, a second elongated bus bar means disposed in a spaced manner along a second side of said drive chain means, said second elongated bus bar means having a front surface therein disposed parallel to and facing said welding electrode, a second V-shaped ridge formed on said front surface, said second horizontal V-shaped channel of said second carrier means being slidably engageable with said second V-shaped ridge on said second elongated bus bar means, said first elongated bus bar means and second elongated bus bar means being connected to a source of welding current supply whereby the welding current is supplied to said welding electrode through said first brush means and second brush means operatively in contact with said metal core.

2. A portable continuous welding apparatus according to claim 1 including a speed control means connected to said drive motor means and being operative for varying the rotation speed of said drive motor means.

3. A portable continuous welding apparatus according to claim 2 wherein said free wheel means is mounted on an adjustable mounting and said mounting being adjustable to vary the position of said free wheel means for selecting the mounting tension of said drive chain means.

4. A portable continuous welding apparatus according to claim 3 wherein said drive wheel means is mounted juxtaposed to said outlet means of said housing.

5. A portable continuous welding apparatus according to claim 4 wherein said drive wheel means is coupled to said drive motor means by a linkage coupling means comprising a transmission bar means rotatably coupled to a drive shaft of said drive motor means and rotatably coupled to said drive wheel means by a worm gear means.

6. A portable continuous welding apparatus according to claim 5 including a control slide switch means mounted in a handle portion of said housing, said slide switch means being operative to operate said speed control means to operate said drive motor means.

7. A portable continuous welding apparatus according to claim 6 including a latch means mounted in said handle portion of said housing and being operative to latch said control slide switch m means in an operative position.

8. A portable continuous welding apparatus according to claim 7 including a power supply cord means mounted to said handle portion of said housing and operative for connecting said apparatus to a source of electrical power.

* * * * *